United States Patent [19]

Katsube et al.

[11] 3,958,042

[45] May 18, 1976

[54] METHOD FOR MANUFACTURE OF REFLECTION-PROOF FILM

[75] Inventors: Shizuko Katsube; Yoshiyuki Katsube, both of Ikeda, Japan

[73] Assignee: Agency of Industrial Science & Technology, Tokyo, Japan

[22] Filed: Mar. 14, 1974

[21] Appl. No.: 451,084

Related U.S. Application Data

[63] Continuation-in-part of Ser. No. 236,983, March 22, 1972, abandoned.

[30] Foreign Application Priority Data

Apr. 5, 1971    Japan.............................. 46-21160

[52] U.S. Cl.................... 427/162; 350/164; 350/165; 427/82; 427/164; 427/166; 427/248; 427/255; 427/419
[51] Int. Cl.²..................... G02B 1/10; C03C 17/22
[58] Field of Search............................ 350/164–166; 117/33.3, 106 R; 427/162, 166, 164, 248, 255, 419

[56]    References Cited
       UNITED STATES PATENTS

| | | | |
|---|---|---|---|
| 3,706,485 | 12/1972 | Fawcett | 117/33.3 |
| 3,712,711 | 1/1973 | Adachi | 350/164 |

FOREIGN PATENTS OR APPLICATIONS

| | | | |
|---|---|---|---|
| 975,184 | 11/1964 | United Kingdom | 117/33.3 |

OTHER PUBLICATIONS

Furman, "Synthesis of Neutral Antireflection Coatings" in Optics and Spectroscopy 21(4), 1966, pp. 280–283.

Fujiwara "Refractive Indices of Evaporated Cerium Dioxide–Cerium Fluoride Films" in J. Opt. Soc. Am. 53(7), p. 880, 1963.

Harris et al., "A Method for the Evaporation of Alloys" in J. of Applied Physics, 19, pp. 739–741, 1948.

Umerov et al., "Preparation of Two Layer Achromatic Antireflection Coatings" in Optics & Spectroscopy 26(6), pp. 556–558, 1969.

*Primary Examiner*—Harry J. Gwinnell
*Assistant Examiner*—William H. Schmidt
*Attorney, Agent, or Firm*—Kurt Kelman

[57]    ABSTRACT

This invention relates to a method for easily vacuum depositing a reflection-proof film having a required refractive index on a substrate such as of lens or semiconductor. Two or more substances each having a different refractive index are mixed in such a proportion that the resultant mixture will acquire a required refractive index. Then, this mixture is divided into a plurality of equal proportions each of an amount to give a vacuum deposited film having a thickness of not more than 1/20 λ. If the vaporization temperatures of the two substances differ by more than 400°C, a two layer film will result. The fractions of the mixture are vacuum deposited consecutively one on top of another until the accumulated total of film thickness reaches a predetermined value.

1 Claim, No Drawings

METHOD FOR MANUFACTURE OF REFLECTION-PROOF FILM

REFERENCE TO COPENDING APPLICATION:

This is a continuation-in-part of our copending application Ser. No. 236,983, filed Mar. 22, 1972 now abandoned.

BACKGROUND OF THE INVENTION:

This invention relates to a method for the manufacture of a reflection-proof film. In lenses for cameras and other optical instruments, the lens quality is improved by placing a multilayer reflection-proof film on the lens surface so as to decrease the amount of light reflected by the lens surface. The reflection-proof film may be of a single layer, depending on the particular purpose of use. Generally, however; it is formed of two or more optical layers, each of which is required to have a refractive index conforming to the refractive index of the substrate, such as glass, being overlaid by the film and at the same time to have a uniform composition throughout.

The methods for the formation of individual layers of a multi-layer reflection-proof film which have heretofore been disclosed to the art include those which resort to vacuum deposition.

Of the vacuum deposition methods suggested to date, particularly popular are the following methods:

a. A method whereby a single compound such as $Na_3AlF_6$, $MgF_2$, $ZrO_2$, $CeF_3$ or $CeO_2$ is vacuum deposited on a substrate such as glass by means of electron beam or evaporation source utilizing a resistance heating means so as to form a vacuum deposited film having an optical film thickness of $\lambda/4$, $\lambda/2$, $3/4\lambda$ ($\lambda$ = medium wavelength in the zone of wavelengths of the light whose reflection is required to be prevented), with the resultant film used as a component film for a multi-layer reflection-proof film.

b. A method whereby two substances each having a different refractive index are vacuum deposited to respectively suitable thicknesses by the method described in (a) above so as to form a symmetrical three-layer component film composed of layers having alternately different refractive indexes or to form a multi-layer film composed of a plurality of the said symmerical three-layer component films. In this case, the resultant film acquires properties of an equivalent film, namely a film possessed of substantially equivalent optical properties to those of a mono-layer film which has a given optical thickness such as $\lambda/4$, $\lambda/2$, or $3/4\lambda$ and a given refractive index.

c. A method whereby two substances each having a different refractive index are mixed in a suitable proportion and the resultant mixture is vaporized by the agency of electron beam of evaporation source utilizing a resistance heating means so as to form a vacuum deposited film of a mixture having a given refractive index, with the resultant film used as a component film for a multi-layer reflection-proof film.

d. A method whereby two substances each having a different refractive index are vaporized at respectively suitable rates by two separate evaporating means so as to form a vacuum deposited film of a mixture having a given refractive index, with the resultant film used as a component film for a multi-layer reflection-proof film.

The conventional methods described above, however, suffer from the following drawbacks:

a. The vacuum deposited film produced from a single substance has a fixed refractive index as shown below. This method therefore, cannot produce a film having any other refractive index.

$Na_3AlF_6$ -1.34; $MgF_2$ -1.39; $ZrO_2$ -1.95; $CeF_3$ and $Al_2O_3$ - 1.60; $CeO_2$, $ZnS$, $TiO$ and $TiO_2$ - 2.3; $ThO_2$ - 1.8; $ThF_4$ and $ThOF_2$ - 1.5 b. In order to obtain an equivalent film possessed of desired optical properties, it becomes necessary to effect rigid control of the thickness of individual film layers in the multi-layer film which is the equivalent film. Such rigid control requires an operation of very high technical level which cannot be obtained in commercial full-scale production.

c. The two substances vaporize at different temperatures. Consequently, the substance which has a lower vaporizing temperature is vacuum deposited before the other substance having a higheer vaporizing temperature has a chance to be vacuum deposited. Thus, it is not feasible to obtain a vacuum deposited film having a uniform composition throughout. The film consequently formed also has an optically heterogeneous structure. This method, therefore, fails to produce a practical reflection-proof film.

d. It is highly difficult to cause two substances to be vaporized from two separate vaporizing sources at such rates that there may be vacuum deposited in a fixed ratio of velocities. With this method, therefore, it is extremely difficult to produce a vacuum deposited film which is homogeneous in composition and has a given refractive index.

SUMMARY OF THE INVENTION:

It is the primary object of this invention to provide a method for easily vacuum depositing a multi-layer reflection-proof film having a required refractive index on the substrate of a lens or semiconductor, particularly a method for vacuum depositing the said multi-layer reflection-proof film in such way that the individual component layers thereof have required optical film thickness and refractive index. More particularly, this invention relates to a method which comprises mixing a substance having a low refractive index with another substance having a high refractive index in such a proportion as to permit the resultant mixture to acquire a desired refractive index, then dividing this mixture into a plurality of equal fractions each of an amount to give a vacuum deposited film of a thickness falling in the range of from $1/20\lambda$ to $1/80\lambda$, and vacuum depositing the fractions of the mixture consecutively one on top of another on the surface of the substrate until the accumulated total of film thickness reaches a predetermined value. The film formed by this method functions as one component layer in a multi-layer reflection-proof film. By the term "multi-layer reflection-proof film" is meant what is constructed by having a plurality of such layers piled one on top of another.

DETAILED DESCRIPTION OF THE INVENTION:

The inventors carried out various studies in search for a novel method excelling the aforementioned methods for the vacuum deposition of a reflection-proof film. As a consequence, they have made a discovery that a multi-layer film obtained by consecutively vacuum depositing a plurality of component multi-layer films each formed from a material prepared in advance by mixing two or more substances selected to give a film of a multi-layer construction as a component film exhibits outstanding optical properties and excels as a component unit for the formation of a reflection-proof coating. The present invention has been accomplished on the basis of this discovery.

In a process for forming an optical film of required refractive index and thickness by the vacuum deposition on the surface of a substrate such as a lens or semiconductor, this invention relates to a method which comprises mixing a substance having a high refractive index with another substance having a low refractive index so as to produce a mixed substance having a required refractive index, dividing this mixed substance into a plurality of equal fractions each of an amount to give a vacuum deposited film of a thickness falling in the range of from $1/20\lambda$ to $1/80\lambda$ and vacuum depositing the fractions of the mixture consecutively one on top of another on the surface of the substrate until the accumulated total of film thickness reaches a predetermined value.

For the vacuum deposition according to this invention, substances which are generally utilized for optical purpose can be used. These substances are broadly divided by the level of refractive index into two classes; those of low refractive indexes and those of high refractive indexes. Generally, substances from the two classes are properly mixed so as to produce a substance from which a vacuum deposited film having a predetermined refractive index is obtained.

As substances of the class having high refractive indexes, there can be cited $TiO$, $TiO_2$, $ThO_2$, $ZrO_2$, $CeO_2$ and $ZnS$, for example. $Al_2O_3$, $ThOF_2$, $ThF_4$, $MgF_2$, $Na_3AlF_6$ and $CeF_3$ are examples of the substances of the class having low refractive indexes. The temperatures at which substances of high refractive indexes undergo vigorous vaporization in a vacuum and substantially form films deposited on substrates (hereinafter referred to as "working vaporization temperature") range from about 2500°C to about 1900°C. The working vaporization temperatures for substances having low refractive indexes fall in the range of from about 1400°C to about 1000°C. When a substance of a high refractive index and a substance of low refractive index are mixed, placed in one boat and heated, it ordinarily follows that the substance of low refractive index is preponderantly vacuum deposited on the substrate at first and the substance of high refractive index is vacuum deposited increasingly more subsequently.

Where a plurality of layers are equivalent, as a whole, to a homogeneous mono-layer film having a fixed refractive index, the whole layer composed of the said plurality of layers is referred to as an equivalent film and the refractive index of the overall layer as an equivalent refractive index respectively.

Generally, the equivalent refractive index varies widely with the overall film thickness even if the combination of the refractive indexes of the individual layers constituting the whole layer and the ratio of the layers' thicknesses are constant. Where the overall film thickness is very small compared with the wavelengths of the light under consideration, however, the equivalent refractive index scarcely varies with the film thickness. If a multi-layer film is formed by piling, one on top of another, a plurality of component equivalent films each having a film thickness of not greater than $1/20\lambda$, a value satisfying the condition just mentioned and if the combination of the refractive indexes of the individual layers composing each component equivalent film and the ratio of the layers' thicknesses are both fixed, then the optical properties of that multi-layer film are substantially equivalent to those of a homogeneous monolayer film having a fixed refractive index. In this case, even if the component equivalent film is geometrically nonsymmetrical, the optical properties of the multilayer film scarcely produce any observable effect on the symmetry.

The theoretical basis underlying the method of this invention described above will be explained in detail herein below.

A case in which there are used two substances A and B having refractive indexes $n_1$ and $n_2$ respectively will be explained by way of example.

Let $a_i$ ($i = 1, 2, 3, ... N$) stand for the thickness of a film formed of A and $b_i$ ($i = 1, 2, 3, ... N$) for the thickness of a film formed of B respectively.

In a multi-layer film composed of N sets of two-layer films $a_1$ and $b_1$, $a_2$ and $b_2$, $a_3$ and $b_3$, ... $a_N$ and $b_N$, if the thickness ratio of $a_i/b_i$ of the two component layers of each set of film is represented as:

$$a_i/b_i = K \ (i = 1, 2, 3, ... N)$$

and further if the sum, $n_1a_i + n_2b_i$, of optical thicknesses of the two component layers of each set of film satisfies the following expression:

$$\frac{1}{80}\lambda < n_1a_i + n_2b_i < \frac{1}{20}\lambda \ (i = 1, 2, 3, .... N)$$

then the equivalent refractive index, $N_e$, of said multi-layer film will be substantially constant despite possible change of the sum, $n_1a_i + n_2b_i$, of optical thicknesses of the two component layers of each set of film.

This means that the equivalent refractive index, $N_e$, is determined only by $n_1$, $n_2$ and K. If A and B are fixed, then the value of K required for obtaining a desired value of $N_e$ can be determined theoretically.

The present invention causes each set of two-layer film to acquire a constant value of K by virtue of the following principle: Two powdered substances, A and B, each possessed of a different vaporization temperature are mixed in such a proportion as to give a voluminal ratio of K. When any fraction of the resultant mixture is vacuum deposited, there is obtained a two-layer film of which the thickness ratio of the component layers is always K, no matter how much of the mixed powder may be used in the vacuum deposition.

In the multi-layer film consequently formed, the equivalent optical thickness, $T_e$, is expressed as follows:

$$T_e = \sum_{i=1}^{N} (n_1a_i + n_2b_i)$$

Therefore, an optically excellent multi-layer film possessed of a required optical thickness can be formed by allowing a multiple of a quarter wavelength to equal said sum as shown below:

$$\sum_{i=1}^{N} (n_1a_i + n_2b_i) = \text{Multiple of a quarter wavelength}$$

The aforementioned upper limit, $n_1a_i + n_2b_i < 1/20\lambda$, is determined on the basis of the theory of equivalent film. Under conditions in which the sum of optical thickness exceeds this upper limit, $N_e$ varies with each film thickness and, therefore, ceases to be a uniform refractive index.

If the sum of optical thickness is not more than the lower limit of $1/80\lambda$ as shown below:

$$n_1 a_i + n_2 b_i < 1/80\lambda$$

then each component film has so small a thickness that the resultant multi-layer film tends to be deprived of characteristics of continuous film and to acquire characteristics rather of a mixed film.

Thus, the method of this invention comprises the steps of mixing at least one substance for vacuum deposition having a high refractive index with at least one substance for vacuum deposition having a low refractive index at such a proportion that the mixed substance acquires a required refractive index, dividing the mixed substance into a plurality of equal fractions each of an amount to give a vacuum deposited film of a thickness falling within a range of from $1/20\lambda$ to $1/80\lambda$, placing the fractions consecutively one after another in a boat, vaporizing the fraction of mixture in a vacuum until there is formed a predetermined thickness of a film of mixed substance on the surface of the substrate. Generally in the formation of a reflection-proof film, the reflection-proofing property is heavily affected by the change in refractive index in the presence of optical heterogeneity. According to the aforementioned theory, since the thickness of a film formed by vacuum deposition of one fraction of mixture is not greater than $1/20\lambda$, the possible variation in the equivalent refractive index is 0.2% or less and produces no adverse effect in particular. If the film thickness does not exceed $1/80\lambda$, the film is so thin that it is extremely difficult to form a complete film. Thus, any film which is formed does not possess properties of a multi-layer film.

Although the preferred embodiments cited hereinafter represent cases in which vacuum deposition was effected by a resistance heating means, vacuum deposition may effectively be carried out by other means such as, for example, electron beam and evaporation sources.

Where two substances to be mixed have vaporization temperatures close to each other, the mixed substance, on vacuum deposition, does not give rise to a complete two-layer film but produces a film in which the composition ratio of the two component substances gradually varies in the direction of film thickness and, consequently, the refractive index is heterogeneously distributed. In this case, the resultant vacuum deposited film is not a complete two-layer film but may well be regarded as an equivalent two-layer film.

In this connection, therefore, the vaporization temperatures of the two component substances are desired to be different by at least 400°C.

The thickness of individual component films which together form a multi-layer reflection-proof film is the quotient of the division of the overall film thickness by the number of the component films: An overall film having a thickness of $\lambda/4$ is obtained by vacuum depositing 5 component films of a thickness of $\lambda/20$ or 10 component films of a thickness of $\lambda/40$ and an overall film having a thickness of $\lambda/2$ is produced by vacuum depositing 10 component films of a thickness of $\lambda/20$ or 20 component films of a thickness of $\lambda/40$ respectively, for example.

The method for the manufacture of a reflection-proof film according to this invention is described below with reference to working examples. The present invention is not limited in any way to the examples.

EXAMPLE 1:

$CeF_3$ and $CeO_2$, each in powdered form, were uniformly mixed in a weight ratio of 1 : 0.12 to produce 0.13 g of mixture. This mixture was divided into ten roughly equal fractions. These fractions of the mixture were placed in ten tungsten boats on a rotary resistance-heating vaporizing device so designed that the boats could be heated sequentially. A glass substrate having a refractive index of 1.62 was held at a height of 25 cm from the device. This device was placed in a vacuum evaporating bath, wherein the fractions in the boats were gradually heated under a pressure not exceeding $5 \times 10^{-5}$ Torr. The fraction in the first boat was vaporized in its whole amount to form a vacuum deposited layer on the surface of the substrate. The fraction in the second boat was similarly vaporized to form a second vacuum deposited layer. The other fractions in the third and subsequent boats were subsequently vaporized. This procedure was followed until the fraction in the seventh boat had been vaporized. Thus, a multi-layer film having an optical film thickness of $1/4\lambda$ ($\lambda$ = 510 $\mu$m) = 128 $\mu$m was vacuum deposited on the aforesaid glass substrate. The layer of film formed by vacuum depositing one fraction of mixture was about $1/28\lambda$. The multi-layer vacuum deposited film had a refractive index of 1.68 and exhibited no irregular optical properties.

A three-layer visible-zone reflection-proof film having excellent properties was formed by vacuum depositing a film of $ZrO_2$ having a thickness of $1/2\lambda$ on top of the aforesaid multi-layer vacuum deposited film and further vacuum depositing a film of $MfF_2$ having a thickness of $\frac{1}{4}\lambda$ on the $ZrO_2$ film. With this film, the reflection ratio was less than 0.5% in the zone of visible wavelengths.

EXAMPLE 2:

$CeF_3$ and $CeO_2$, each in powdered form, were uniformly mixed in a weight ratio of 1 : 1.5 to produce 0.2 g of mixture. The mixture was divided into 20 roughly equal fractions. By using a rotary resistance-heating vaporizing device fitted with 20 tungsten boats, these fractions were vacuum deposited by following the procedure of Example 1 until there was obtained a multi-layer film having an optical film thickness of $1/2\lambda$ ($\lambda$ = 510 $\mu$m) = 255 $\mu$m on a glass substrate having a refractive index of 1.7 which was placed at a height of 25 cm from the device. The accumulated total of film thickness reached the predetermined value during the vacuum deposition of the fifteenth fraction. The multi-layer film thus obtained exhibited a refractive index of 1.95. A two-layer visible zone reflection-proof film whose maximum reflection ratio at the center of the visible zone of wavelengths was below 0.5% could be obtained by vacuum depositing a film of $MgF_2$ having a thickness of $1/4\lambda$ on top of this multi-layer vacuum deposited film by an ordinary method.

EXAMPLE 3:

The multi-layer vacuum deposited film of Example 1 was formed by following the procedure of that example. On top of this film, the multi-layer vacuum deposited film and the $MgF_2$ film of Example 2 were formed by following the procedure of that example. Consequently, there was formed a three-layer visible-zone reflection-proof film having excellent properties. With this film, the reflection ratio in the visible zone of wavelengths was less than 0.5%.

We claim

1. A method for vacuum depositing a homogeneously composed optical film onto the surface of a substrate which method consists essentially of:
    1. mixing one component having low refractive index, the low refractive index component having a vaporization temperature of from 1000°C to 1400°C, and selected from the group consisting of $ThOF_2$, $ThF_4$, $MgF_2$, $Na_3AlF_6$, $Al_2O_3$ and $CeF_3$ with one component of high refractive index, the high refractive index component having a vaporization temperature of from 1900°C to 2500°C, and selected from the group consisting of ZnS, TiO, $TiO_2$, $ThO_2$ $ZrO_2$ and $CeO_2$ in proportion such that the resultant mixture has a required refractive index;
    2. dividing the said mixture into fractions each of an amount to give a vacuum deposited film of a thickness falling within a range of from $1/20\lambda$ to $1/80\lambda$, wherein $\lambda$ is the medium wavelength in the zone of wavelengths of the light whose reflection is to be prevented;
    3. heating one of the divided fractions under reduced pressure and controlled temperatures such that the compound of low refractive index is first vaporized out of that fraction and allowed to form a film substantially of the compound of low boiling point on the surface of a substrate;
    4. thereafter heating and vaporizing the compound of high refractive index and depositing a film substantially of the compound of high refractive index onto the film previously formed substantially of the compound of low refractive index until the entirety of said fraction is vacuum deposited on said substrate; and
    5. causing remaining fractions to be vacuum deposited one on top of another by repeating the procedure of Steps (3)-(4) under reduced pressure and controlled temperature until the overall thickness of the vacuum deposited optical film having a required refractive index and a thickness of $n.1/4\lambda$, wherein $n$ is an integer.

\* \* \* \* \*